Jan. 5, 1926.
B. A. FISKE
1,568,148
READING MACHINE
Filed Feb. 21, 1925
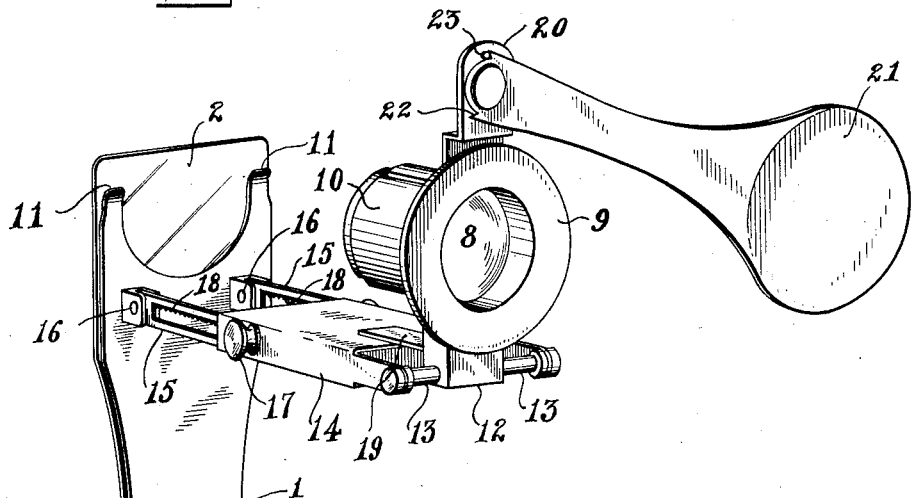
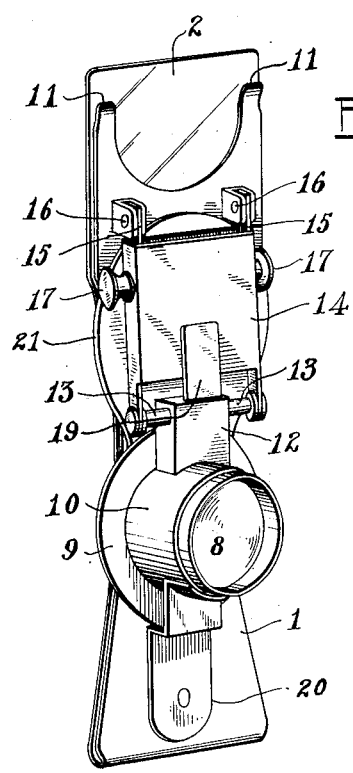
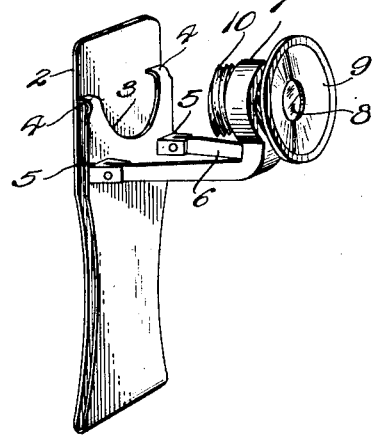
INVENTOR
Bradley A. Fiske
BY
Frank L. Dyer
ATTORNEY Patented Jan. 5, 1926.

1,568,148

UNITED STATES PATENT OFFICE.

BRADLEY A. FISKE, OF NEW YORK, N. Y.

READING MACHINE.

Application filed February 21, 1925. Serial No. 10,849.

*To all whom it may concern:*

Be it known that I, BRADLEY A. FISKE, Rear Admiral (retired) United States Navy, a citizen of the United States, residing in the borough of Manhattan, city, county, and State of New York, and whose post-office address is Waldorf-Astoria Hotel, Fifth Avenue and 34th Street, New York city, have invented certain new and useful Improvements in Reading Machines, of which the following is a full, clear, and exact description.

In Letters Patent of the United States No. 1,476,290 dated December 4, 1923, I have disclosed certain improvements in the art of providing reading matter for the public in which typewritten or printed matter is photographically reduced to very small size, thus requiring the employement of magnifying devices to permit the printed matter to be read, and in the same patent and also in Patent Nos. 1,411,008 of March 8, 1922 and 1,457,429 of June 5, 1923, I have disclosed various mechanical arrangements of machines employing magnifying lenses intended for use in reading printed matter which has been very greatly reduced in size.

My present invention relates to new and useful improvements in reading machines intended for the purpose described, and my objects generaly are to provide a reading machine for the purpose which is convenient to use, which may be readily carried in a pocket, owing to its small size and convenient shape, which may be used in connection with minute printed matter on cards or sheets of widely varied sizes and shapes, with which the printed matter may be quickly and easily shifted from the point to point, so as to bring any portion thereof within the field of the magnifying lens, which is inexpensive to manufacture, which is simple and durable and not liable to get out of order, and which is attractive in appearance.

In order that the invention may be better understood attention is directed to the accompanying drawings forming a part of this specification and in which:

Fig. 1 is a perspective view of a very simple form of the device:

Fig. 2 a similar view of a somewhat improved and preferred form; and

Fig. 3 a similar view of the device shown in Fig. 2 in folded position.

Referring first to Fig. 1, the device comprises a sheet metal body bent upon itself at the bottom, as shown, to comprise a face 1, and a back 2, essentially parallel. The metal used is resilient so that the card, sheet or other paper carrying the printed matter, will be gripped with the desired friction while it is being read. At the sides the body may be cut away slightly, as shown, to permit the same to be more easily and conveniently grasped as a handle by the hand of the user. The upper part of the face 1 is cut away as shown at 3, corresponding with a part of the field of the magnifying lens. The upper tips 4 of the face 1 are bent at right angles toward the back 2, so as to form fingers or projections for firmly holding the reading matter in position, as will be understood. Attached to the face 1 are lugs 5, to which are pivoted, as shown, the bifurcated legs 6, whereby these legs may be swung downward so as to be essentially parallel with the face 1, and thus make the device more compact when not in use. The pivoting of the legs 6 in the lugs 5 is effected with sufficient friction to hold the legs 6 in their normal horizontal position, shown in the drawing, when the device is being used. Formed integrally with the legs 6 is an internally threaded eye or frame 7, for supporting the lens 8, eye-piece 9, and externally threaded lens holder 10. The lens holder 10 screws into the threaded eye or frame 7, whereby the lens may be adjusted back and forth with reference to the reading matter so as to secure the desired focus. The periphery of the eye-piece 9 may be marked with lines and symbols (not shown) as is generally common in the optical arts, so as to constitute a ready reference for future adjustment when once the proper focusing position of the lens has been secured and noted. If desired, a limiting stop or stops (not shown) may be made use of to limit the upward swinging movement of the pivoted legs 6 to the horizontal position shown in the drawing.

In operation the device is held in either hand and the printed matter on a card, sheet, strip, or other form, is introduced into the frame under the projections or fingers 4, until the portion which it is desired to read has been brought within the cut out section 3. The eye is then applied to the eye-piece, and the lens having been properly focused, the printed matter may then be read, while the other hand is always free to move any part of the printing into position within the field of the lens without removing the eye from the eye-piece. It will be noted that the clamp or frame is open on three sides so that any width sheet or card of printed matter may be used, the height of the sheet or card being only limited by the distance between the cut away portion 3 and the lower end of the frame.

Referring to the form of device shown in Figs. 2 and 3 the frame, as before, comprises the face 1 and back 2 made of suitable resilient metal. Here the inturned fingers or tips 4 are omitted and the upper forked ends of the face 1 are slightly curved outwards, as at 11, so as to facilitate the introduction of the card or sheet into the device. With this form of the invention the lens holder 10 (carrying the lens 8 and eye-piece 9) is supported by a block 12 provided with pivots 13 mounted in a frame 14, whereby the parts may be moved pivotally so as to bring the block 12 in position parallel with the frame 14 when folding is to be effected as shown in Fig. 3. The frame 14 is movable back and forth on two arms 15, 15, which are pivoted between pairs of ears 16, 16 in such a way that the swinging movement of the arms 15 will be limited when said arms reach a position at right angles to the face 1 as shown in Fig. 2. By sliding the frame 14, 14 back and forth on the pivoted arms 15, the lens 8 will be focused with respect to the reading matter. Preferably I effect this focusing by well known means common in the optical arts, comprising a thumb nut 17 whose shaft is provided with two pinions (not shown) meshing with racks 18 formed in the arms 15, whereby the turning of the thumb nut will effect a parallel movement back and forth of the frame 14. In order to limit the pivoted movement of the lens to the position in Fig. 2, I provide a stop 19 on the frame 14 and with which the block 12 comes into engagement.

Sufficient friction is provided in the pivots of the arms 15 and between the pivots 13 and frame 14 as to preserve the parts in their proper operative position shown in Fig. 2, but at the same time permit them to be moved to the folded position shown in Fig. 3.

Preferably I provide the lens holder 10 with an upward extension 20 to which is pivoted a blinder 21 adapted in use to be moved to the position shown in Fig. 2 so as to permit the reader to use the device with both eyes open, as will be obvious. This blinder is provided with two notches 22 cooperating with the pin 23 so as to limit its movement to one side or the other depending whether the reader is using his right or left eye.

The folding of the parts from the position shown in Fig. 2 to the position shown in Fig. 3 will be obvious. The blinder 21 is first moved to a central position whereupon the lens holder is swung on the pivots 3 to bring the block 12 in parallel alignment with the frame 14, and then these parts as a whole are moved pivotally with respect to the ears 16, so as to present a general parallel arrangement of all the elements of the device as shown in Fig. 3.

Having now described my invention, what I claim as new therein and desire to secure by Letters Patent is as follows:

1. In a reading machine, the combination with the lens, of a frame on which the lens is mounted, said frame constituting a spring clamp, open on three sides, for holding the paper, sheet or card which carries the reading matter, substantially as set forth.

2. In a reading machine, the combination with the lens, of a frame on which the lens is pivotally mounted, said frame constituting a spring clamp, open on three sides, for holding the paper, sheet or card which carries the reading matter, substantially as set forth.

3. In a reading machine, the combination with a frame constituting a spring clamp, open on three sides, for holding the sheet, card or paper carrying the reading matter, of a supporting frame pivoted to the clamp, movable into position either parallel to the clamp or at right angles thereto, and a lens carried by the supporting frame and adjustable back and forth to permit the focusing with respect to the reading matter carried by the clamp, substantially as set forth.

4. In a reading machine, the combination with a frame constituting a spring clamp open on three sides for holding the sheet, card or paper carrying the reading matter, of a supporting frame pivoted to the clamp movable into position either parallel to the clamp or at right angles thereto, and a lens carrier pivoted to the supported frame, substantially as set forth.

5. In a reading machine, the combination with a frame constituting a spring clamp open on three sides for holding the sheet, card or paper carrying the reading matter, of a supporting frame pivoted to the clamp, a lens carrier pivoted to said frame and a blinder pivoted to said lens carrier, substantially as set forth.

6. In a reading machine, the combination with a frame constituting a spring clamp open on three sides for holding the sheet, card or paper carrying the reading matter, of a supporting frame pivoted to the clamp and adjustable back and forth with respect to the same and a lens carrier pivoted to said frame, substantially as set forth.

This specification signed this 29th day of January, 1925.

BRADLEY A. FISKE.